US009211482B2

(12) United States Patent
Kaminski et al.

(10) Patent No.: US 9,211,482 B2
(45) Date of Patent: Dec. 15, 2015

(54) METHODS AND APPARATUS FOR PURIFYING LIQUID USING REGENERATING HEAT EXCHANGE

(75) Inventors: Joseph W. Kaminski, Campbell, CA (US); Charles J. Borg, San Francisco, CA (US); Dariush Golpira, Westlake Village, CA (US)

(73) Assignee: Waterpointe—Global, LLC, San Francisco, CA (US)

( * ) Notice: Subject to any disclaimer, the term of this patent is extended or adjusted under 35 U.S.C. 154(b) by 781 days.

(21) Appl. No.: 13/214,114

(22) Filed: Aug. 19, 2011

(65) Prior Publication Data

US 2013/0043118 A1   Feb. 21, 2013

(51) Int. Cl.
| | | |
|---|---|---|
| *B01D 1/28* | (2006.01) | |
| *B01D 3/02* | (2006.01) | |
| *C02F 1/04* | (2006.01) | |
| *F28D 15/00* | (2006.01) | |
| *F28D 21/00* | (2006.01) | |
| *B01D 5/00* | (2006.01) | |
| *C02F 1/06* | (2006.01) | |
| *C02F 1/18* | (2006.01) | |

(52) U.S. Cl.
CPC ............... *B01D 1/2887* (2013.01); *B01D 1/28* (2013.01); *B01D 1/289* (2013.01); *B01D 3/02* (2013.01); *B01D 5/006* (2013.01); *B01D 5/0039* (2013.01); *C02F 1/041* (2013.01); *C02F 1/06* (2013.01); *C02F 1/18* (2013.01); *F28D 21/0001* (2013.01); *Y02W 10/37* (2015.05); *Y10S 203/08* (2013.01)

(58) Field of Classification Search
CPC .......... B01D 3/02; B01D 3/42; B01D 5/0039;
B01D 5/006; C02F 1/041; C02F 1/048;
C02F 1/06; C02F 1/18; C02F 2303/10;
F28D 15/00; F28D 21/0001; F28D 21/0066;
F28D 21/0012; F28D 7/103; F28D 7/1615;
F28B 1/02; F22B 1/00; B01B 1/00; Y10S
159/40; Y10S 202/00; Y10S 165/00; Y10S
203/08; Y10S 203/18; Y10S 203/90
See application file for complete search history.

(56) References Cited

U.S. PATENT DOCUMENTS

| | | | | | |
|---|---|---|---|---|---|
| 1,738,194 | A | * | 12/1929 | Morris et al. ................. | 361/296 |
| 2,589,406 | A | * | 3/1952 | Latham, Jr. ..................... | 203/2 |
| 2,812,157 | A | * | 11/1957 | Turunen et al. ............. | 416/96 R |
| 2,980,081 | A | * | 4/1961 | Bennett ........................ | 122/7 R |
| 3,227,630 | A | * | 1/1966 | Beckman ...................... | 202/205 |
| 3,288,685 | A | * | 11/1966 | Kemper et al. ................ | 203/11 |
| 3,305,454 | A | * | 2/1967 | Cowley ......................... | 202/205 |
| 3,336,207 | A | * | 8/1967 | Peterson ........................ | 376/391 |

(Continued)

FOREIGN PATENT DOCUMENTS

WO      2007/148482    *  12/2007

*Primary Examiner* — Virginia Manoharan
(74) *Attorney, Agent, or Firm* — James M Wu; JW Law Group

(57) ABSTRACT

A method and apparatus for liquid purification using regenerating heat exchange are disclosed. An apparatus, in one embodiment, includes a liquid receptacle, a heat exchanger, a heating mechanism, a compressor, and a condenser. While the liquid receptacle is able to receive a stream of liquid such as water, a heat exchanger pushes the liquid through the heat exchanger to increase temperature of the liquid. The heating mechanism is capable of facilitating phase transition of the liquid from liquid to vapor. The compressor is operable to guide the vapor and the condenser is configured to condense the vapor into liquid or purified liquid.

17 Claims, 20 Drawing Sheets

(56) References Cited

U.S. PATENT DOCUMENTS

| | | | |
|---|---|---|---|
| 3,398,060 A * | 8/1968 | Cowley | 203/11 |
| 3,423,293 A * | 1/1969 | Holden | 202/172 |
| 3,522,152 A * | 7/1970 | Osdor | 203/11 |
| 3,698,379 A * | 10/1972 | Cheney | 126/59.5 |
| 3,803,001 A * | 4/1974 | Carnavos | 202/176 |
| 3,857,244 A * | 12/1974 | Faucette | 60/641.2 |
| 4,282,067 A * | 8/1981 | Katz et al. | 202/180 |
| 4,440,601 A * | 4/1984 | Katz et al. | 203/24 |
| 4,799,542 A * | 1/1989 | Sladky | 165/118 |
| 5,591,310 A * | 1/1997 | Olrik | 202/160 |
| 6,402,897 B1 * | 6/2002 | Gunn | 203/1 |
| 8,505,323 B2 * | 8/2013 | Kamen et al. | 62/285 |
| 2005/0016828 A1 * | 1/2005 | Bednarek et al. | 203/1 |

\* cited by examiner twelve flutes assembly

METHODS AND APPARATUS FOR PURIFYING LIQUID USING REGENERATING HEAT EXCHANGE

FIELD

The exemplary embodiment(s) of the present invention relates to purification process. More specifically, the exemplary embodiment(s) of the present invention relates to a process and apparatus for liquid or water purification.

BACKGROUND

Clean water is critical to all life forms including humans or animal on this planet. With enhanced technology and information technology in recent years, demand of consumable drinking water or high quality drinkable water is steadily increasing across the globe. For example, readily available clean drinkable water can reduce disease, epidemic, poverty, and/or conflict throughout the world. With increasing world population and finite amount of clean water, demand of high quality clean water will continue in the future.

The standards for drinking water are typically set by governments, local authorities, or industry associations, and such standards typically set limits of maximum amount of contaminants that could have in the water but still safe for human consumption. To provide clean water, various water purification techniques have been developed over the years. For example, conventional purification systems include carbon filtration, membrane filtration, chlorination, ion exchange, oxidation, and/or reverse osmosis. A drawback associated with such techniques is that conventional purification techniques may require numerous treatment steps in order to be able to remove contaminants, such as living organisms, bacteria, viruses, arsenic, lead, and mercury.

A typical approach to solve the conventional purification system is to use vapor distillation process to purify water. A problem associated with a typical water distiller is that they are large, costly, and inefficient. For example, a conventional water distiller consumes large amount of energy such as electricity to produce small amount clean or distilled water. Another problem associated with a typical household or laboratory water distiller is that it takes hours to produce one gallon of clean water.

SUMMARY

A method and apparatus for liquid purification using regenerating heat exchange are disclosed. An apparatus or heat reclaim purification ("HRP") system, in one embodiment, includes a liquid receptacle, a heat exchanger, a heating mechanism, a compressor, and a condenser. The liquid receptacle, in one example, is able to receive a stream of liquid such as water. The heat exchanger is configured to push or force the received stream of liquid through the heat exchanger to preheat or increase the temperature of the incoming cold liquid. The heating mechanism is capable of facilitating phase transition from liquid to vapor. While the compressor is operable to guide the vapor through the condenser, the condenser condenses the vapor into liquid or purified liquid before it leaves the apparatus.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
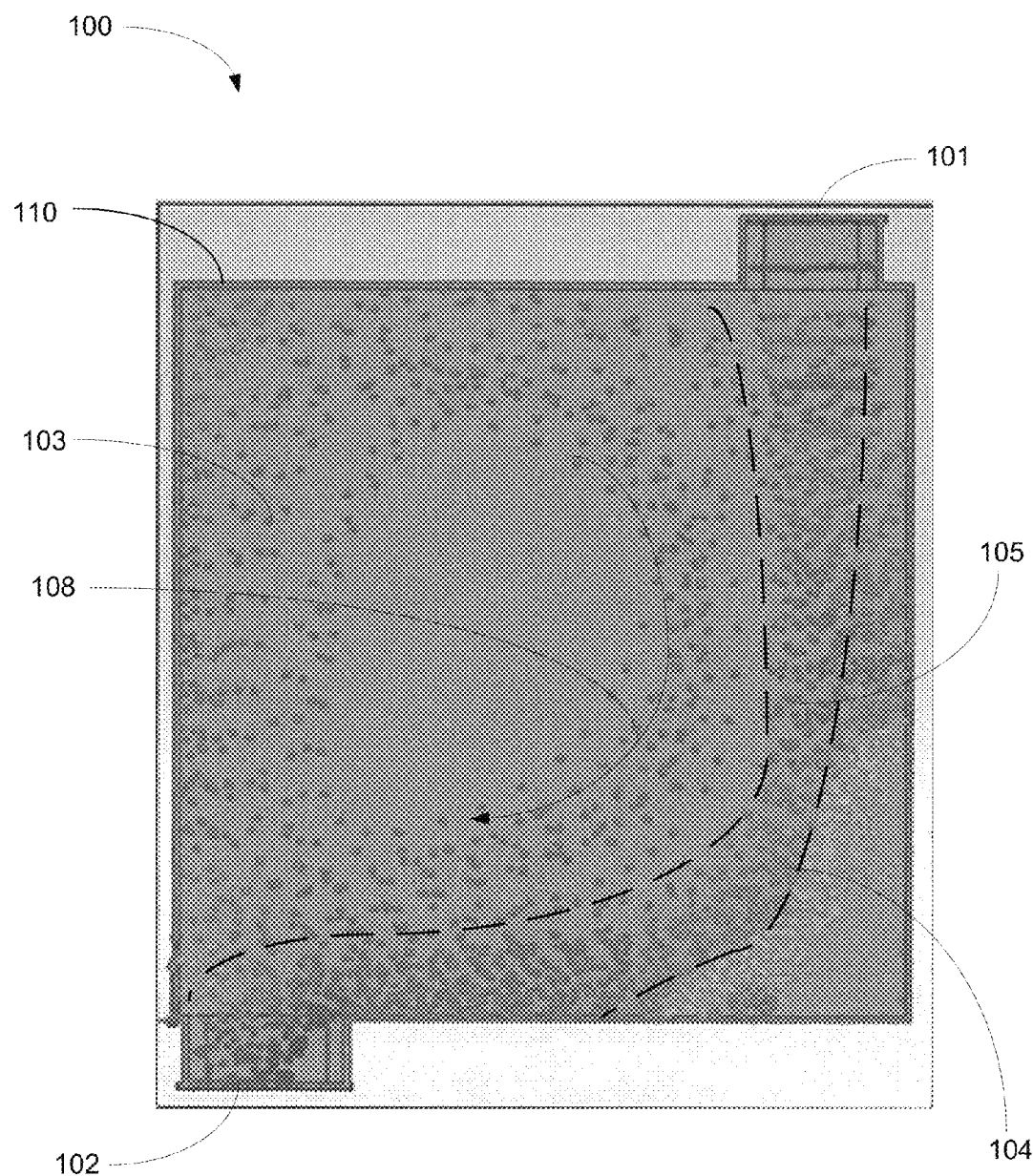
FIGS. 1A-C are diagrams illustrating an exemplary heat profile during a liquid purification process in accordance with one embodiment of the present invention.

Exemplary embodiment(s) of the present invention is described herein in the context of a method, device, and apparatus for liquid processing using heat regenerative mechanism achieving optimal energy efficiency.

Those of ordinary skills in the art will realize that the following detailed description of the exemplary embodiment(s) is illustrative only and is not intended to be in any way limiting. Other embodiments will readily suggest themselves to such skilled persons having the benefit of this disclosure. Reference will now be made in detail to implementations of the exemplary embodiment(s) as illustrated in the accompanying drawings. The same reference indicators will be used throughout the drawings and the following detailed description to refer to the same or like parts.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The term "system" is used generically herein to describe any number of mechanical components, elements, sub-systems, devices, units, assemblies, mechanisms, or combinations of components thereof. The term "circuits," "computer," "integrated circuits," "electrical controller," "optical sensors," or "sensors," may include a processor, memory, and buses capable of executing instruction wherein the computer refers to one or a cluster of computers, personal computers, or combinations of computers thereof. The term "purifying" is used generically herein to describe reducing or altering concentration of one or more contaminants to a specified range.

Embodiments of the present invention discloses a liquid or water purification apparatus capable of purifying liquid or water using regenerative heat exchanger. The apparatus includes a liquid receptacle, a heat exchanger, a heating mechanism, a compressor, and a condenser. The liquid receptacle, for example, is able to receive a stream of liquid such as water or liquor. In one embodiment, the liquid receptacle includes a water-input receptacle capable of receiving a flow or stream of water from an external device. The stream of water, for example, is pressurized having a range from two (2) pounds per square inch ("PSI") to 500 PSI. The water has a molecular structure of one oxygen and two hydrogen atoms connected by covalent bonds ("$H_2O$").

The heat exchanger, in one aspect, pushes or forces the received stream of liquid through the heat exchanger to preheat or increase the temperature of the liquid via at least a portion of processed liquid. The heat exchanger further includes a top or main heat exchanger and a bottom heat exchanger. While the top heat exchanger is configured to preheat incoming water with the purified water, the bottom heat exchanger preheats incoming water with the discarded water. Alternatively, the top heat exchanger is also configured to extract heat from purified water with incoming water before the purified water leaves the apparatus. The bottom heat exchanger cools down discarded water with incoming water before the discarded water leaves the apparatus as waste water.

The heating mechanism generates heat to facilitate phase transition from liquid to vapor. In one embodiment, the heating mechanism has a heater configured to heat water to a boiling point to separate purified water from impurities. The heating mechanism includes a heater, such as a burner, a magnetic inductance heat generator, resistance heating element, et cetera.

The compressor guides or forces the vapor through the condenser, wherein the compressor includes a turbine operable to create a directional vapor whirlpool inside of a boiler to force the vapor into the condenser. In one embodiment, the compressor creates a vacuum to alter the boiling point for the liquid or water to speed up the separation of purified water from incoming water.

The condenser condenses vapor into liquid or purified liquid before it leaves the apparatus. The condenser further includes a set of blades or flutes wherein each blade is shaped in such a way that it optimizes liquid condensation from vapor to purified water. In one embodiment, the liquid purification apparatus also includes a housing which is configured to house the heat exchanger which is configured to fit both the compressor and condenser in the middle of heat exchanger.

FIG. 1A is a diagram illustrating an exemplary heat profile or temperature profile during a liquid purification process in accordance with one embodiment of the present invention. Diagram illustrates a cross-section side view of a heat reclaim purification (HRP) system 100 capable of processing or purifying liquid, such as water, or any other liquid that could be purified by distillation process. HRP system 100 includes a condenser 110 having an input port 101 and an output port 102 wherein input port 101 receives gas such as water vapor while output port 102 releases processed liquid such as purified water. It should be noted that the underlying concept of the exemplary embodiment(s) of the present invention would not change if one or more components (or blocks) were added to or removed from diagram 100.

FIG. 1A illustrates a computer simulated heat or temperature profile of HRP system 100 during a water purification process using regenerative heat exchanger wherein the water vapor or vapor enters input port 101. In one embodiment, when water vapor is being rushed or forced into condenser 110 as a fast moving vapor jet or stream via a compressor, not shown in FIG. 1A, the fast moving vapor creates a directional vapor whirlpool 108 inside the condenser. The heat profile illustrates a main stream of directional vapor jet 105 moving from input port 101 to output port 102. The warmest or hottest area of the heat profile, in one aspect, is indicated by numeral 104 while the coolest area is indicated by numeral 103. In one aspect of the present invention, condenser 110 is able to produce purified water in accordance with the heat profile, and is capable of recapturing, regenerating, or reclaiming heat (or energy) released from phase transition between vapor and liquid. For example, vapor stream entering from input port 101 and exiting output port 102 as liquid gives off heat during the phase transition.

A regenerative heat exchanger facilitates two flows or streams of fluid or liquid such as coming water and exiting purified water to flow through a heat exchanger in logically opposite direction or in a configuration of countercurrent exchanger. The heat exchanger having components, such as pipes, tubes, and/or channels, is able to maintain two moving flows separated while physically adjacent with each other to facilitate heat exchange. The heat or temperature profile may remain at a nearly constant temperature which includes the entering flow (cold or ambient water) and exiting flow at each end. In regenerative heat exchangers, in one example, uses a cyclical and/or repetitive treatment or process to preheat the incoming cold water via heat released by the processed water. The processed water includes purified water and discarded water. The discarded water is also known as waste water which contains relatively high concentration of impurities.

To operate, incoming cold water enters the heat exchanger and is preheated by heat extracted from processed water exiting the heat exchanger. The regenerative heat exchanger is able to conserve energy since a large amount of the heat energy is reclaimed or recaptured in a thermodynamically reversible way. Depending on the applications, the heat exchanger can have a range of thermal efficiency from 50% to 95% by transferring heat energy from a hot directional water flow to a cold directional water flow.

Figure 1B:
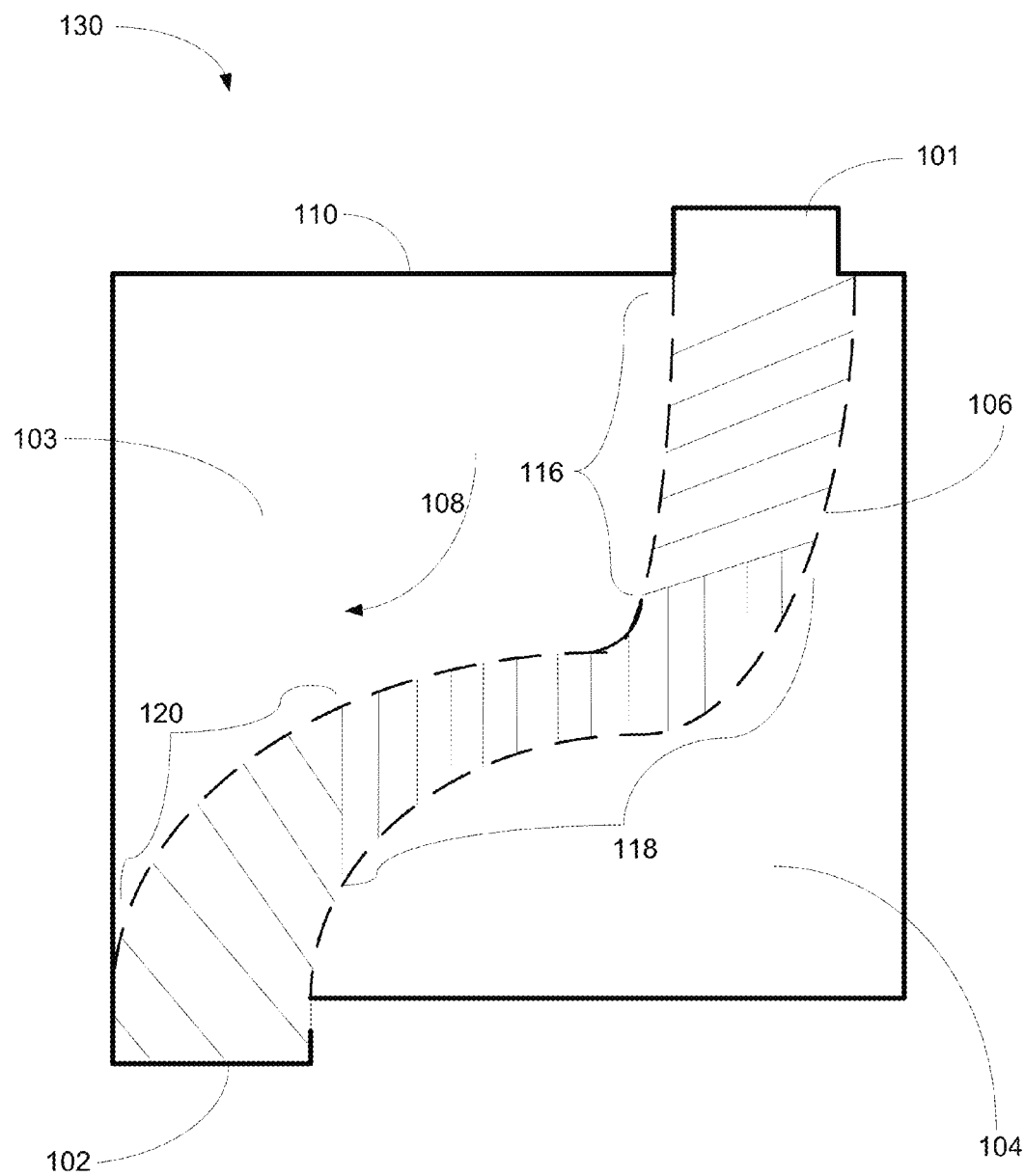

To condense vapor into purified water in accordance with the heat profile as illustrated in FIG. 1A, condenser 110 employs multiple blades or flutes 106 according to main stream of directional vapor jet 105 as illustrated in FIG. 1B. In one embodiment, blade 106 includes vapor section 116, phase changing section 118, and liquid section 120, wherein the phase changing section 118 releases heat since the water molecule gives off energy when it transforms its physical formation from vapor (or gas formation) to liquid (or fluid formation). Depending on the applications, the shape of blade or flutes 106 may change in accordance with the vapor jet. It should be noted that the term "blade" and "flute" are used interchangeably herein. Also, the term "vapor" and "water vapor" are used interchangeably herein.

Water is a chemical substance having a chemical formula $H_2O$ wherein its molecule structure contains one oxygen and two hydrogen atoms connected by covalent bonds. Depending on the temperature, water can be in different physical formation. For example, water is in a liquid formation at ambient or room temperature. Water is in vapor, steam, gas (or gaseous) formation when the temperature is at or above water's boiling point. It should be noted that the description uses water and/or water vapor as an exemplary chemical substance and the underlying concept of HRP system 100 is applicable to any other chemical substances capable of changing their physical formation in view of their boiling points as well as environmental pressure.

The boiling point of a chemical substance such as water is a temperature wherein vapor pressure of fluid is similar to surrounding or environmental pressure over the fluid or liquid. If the chemical substance in its liquid formation such as water, it has a lower boiling point in a low pressure or vacuum environment than when the water is at atmospheric pressure. Similarly, water or liquid has a higher boiling point in a high pressure surrounding than the water is at atmospheric pressure. As such, different chemical substance having different chemical compounds possesses different boiling points. Accordingly, the fluctuation of boiling point for a particular chemical substance such as water is a function of temperature and pressure.

Figure 1C:
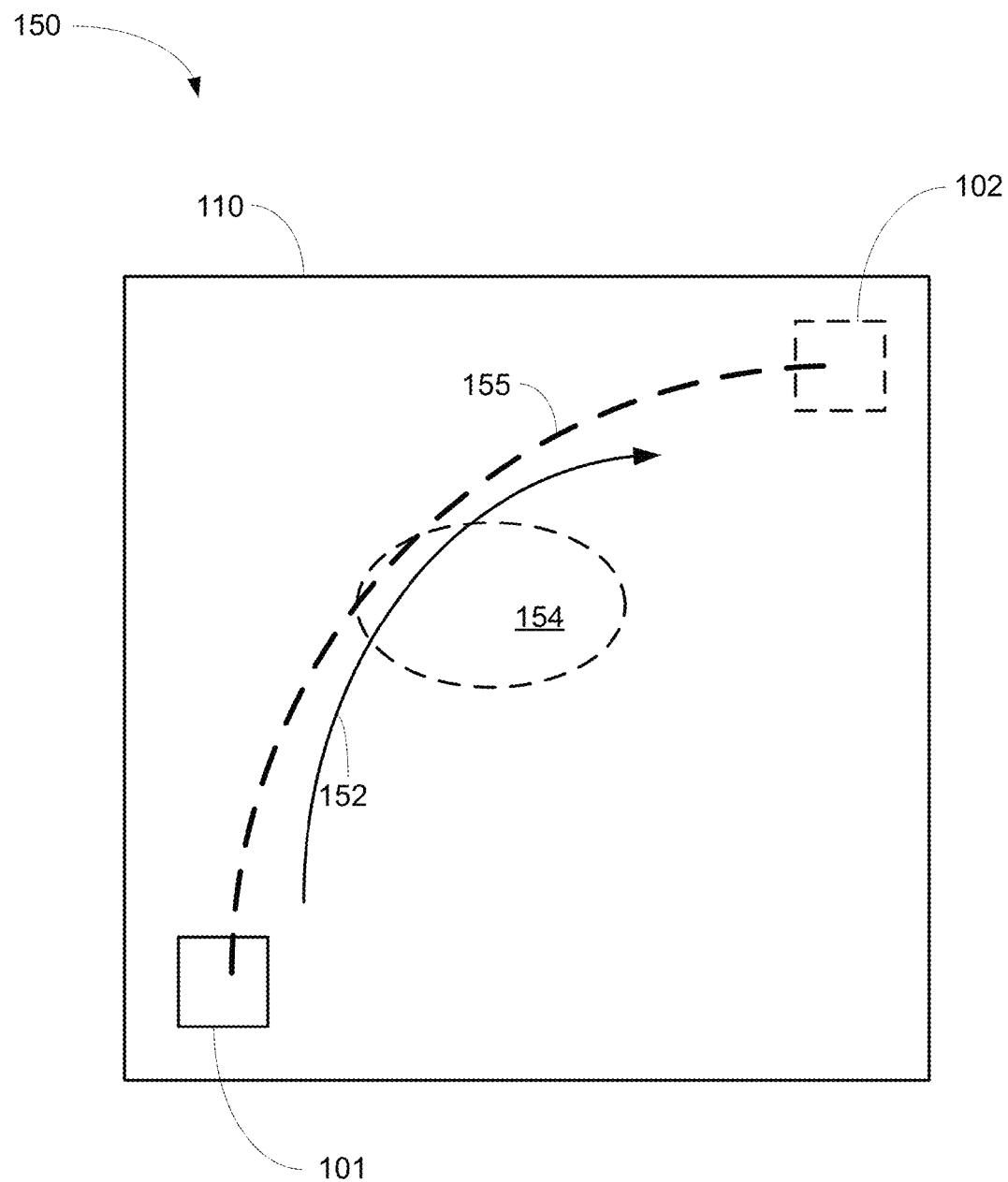

FIG. 1C is a diagram 150 illustrating a top view of the diagram in FIG. 1A showing an exemplary heat profile during a liquid purification process in accordance with one embodiment of the present invention. With respect to diagram 100, input port 101 is situated on the top of condenser 110 at the lower left corner while output port 102 is situated at the bottom of upper right corner of condenser 110. A directional steam or vapor jet 152 is formed whereby pressurized vapor jet entering input port 101 and exiting output port 102 according to a vapor flow traveling path 155. In one aspect, the heat exchange occurs at area 154 which is generally the hottest/warmest spot in the directional vapor jet 152. It should be noted that converting water into vapor requires sufficient energy required to vaporize water into vapor.

Figure 2:
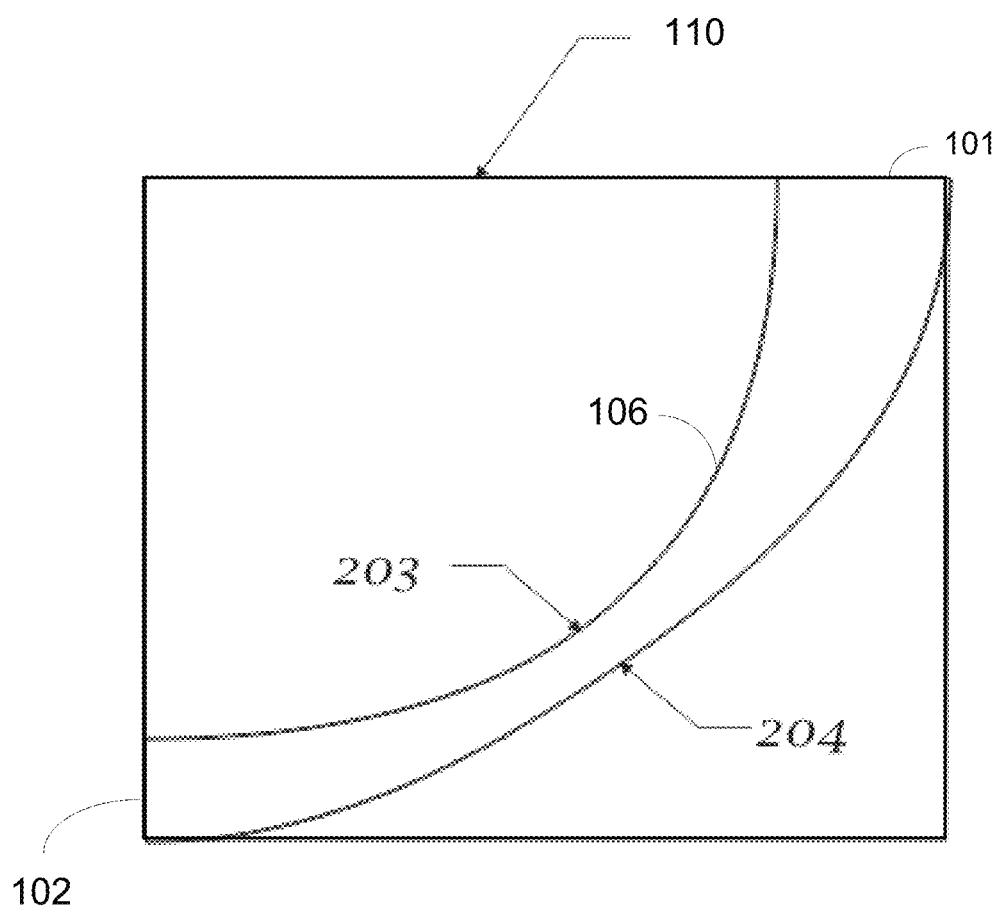
FIGS. 2-3 are diagrams illustrating configurations of blades or flutes for condensation in accordance with one embodiment of the present invention.
Figure 3:
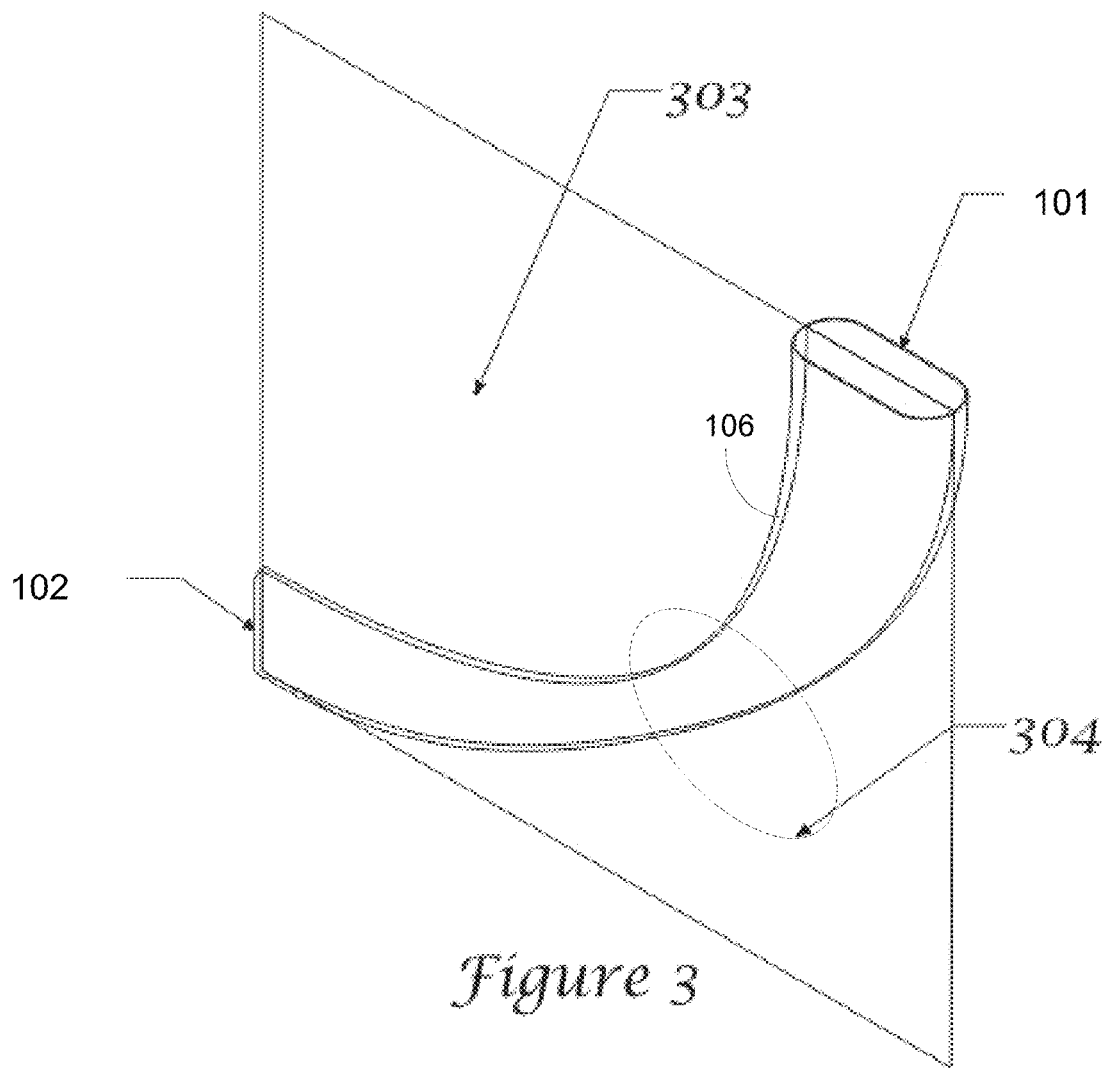

FIG. 2 illustrates condenser 110 having a blade 106 configured in accordance with one embodiment of the present invention. The shape of blade 106 is structured and/or configured in accordance with the shape of directional vapor jet 105 as shown in FIG. 1A. Blade 106 includes an input port 101 and an output port 102. Depending on the applications, the shape of blade 106 may vary. For example, a narrow section 203-204 of blade 106 may change depending on volume and speed of vapor flow. FIG. 3 illustrates a three dimensional ("3D") view of blade 106 with input port 101. In one aspect, the area pointed by numeral 304 is the warmest area while the area pointed by numeral 303 is the coolest in the condenser.

Figure 4:
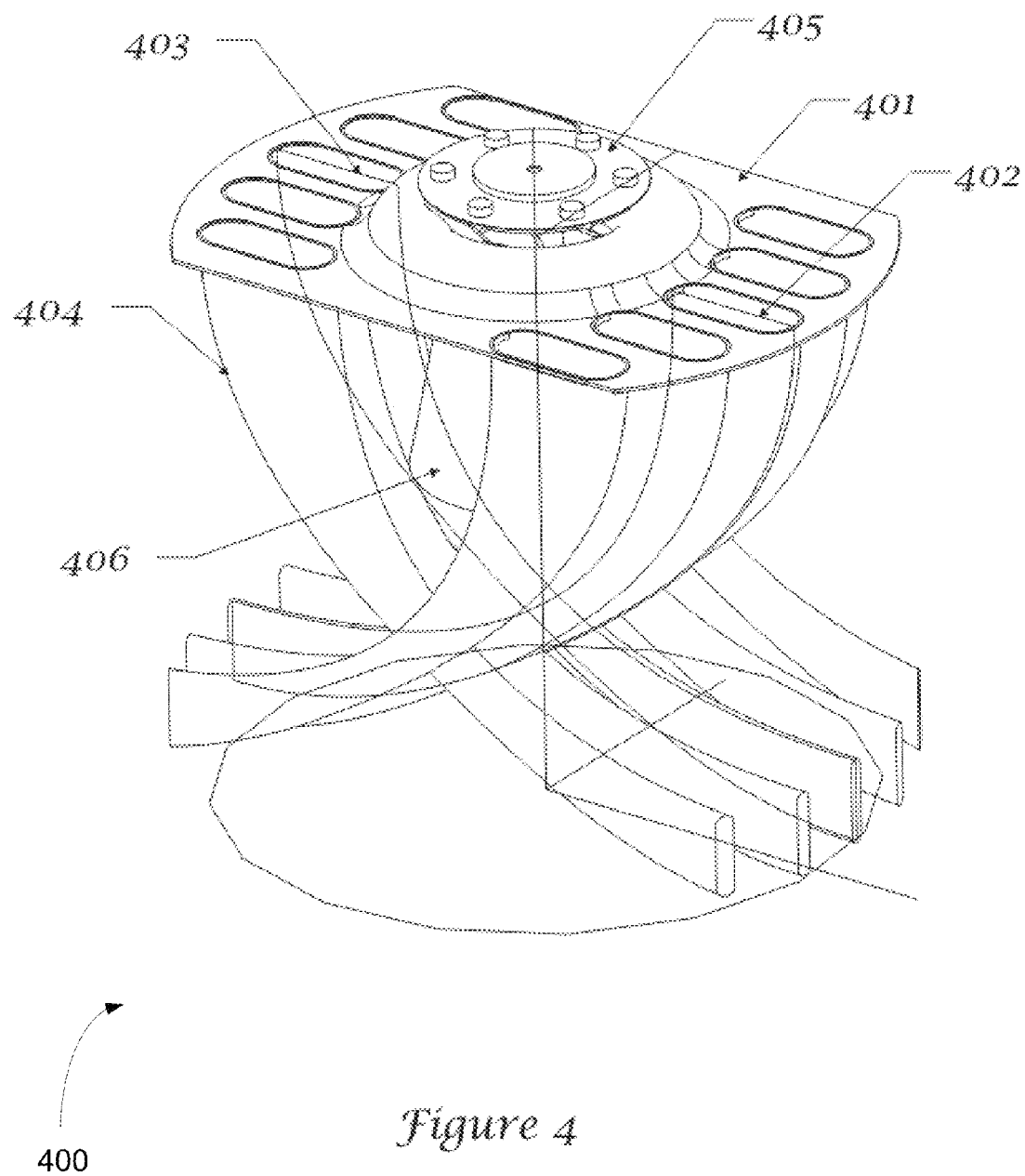
FIG. 4 is a diagram illustrating an isometric view of a turbine and condenser blades for liquid purification process in accordance with one embodiment of the present invention.

FIG. 4 is an isometric diagram 400 illustrating a turbine and condenser blades for liquid purification process in accordance with one embodiment of the present invention. Diagram 400 shows a structural layout between a turbine 405, multiple blades 404, and a flow guide 406. Turbine 405, in one embodiment, includes a motor and turbine blades configured to create a vacuum or low pressure area in the vicinity of flow guide 406. The motor and turbine blades, for example, can be fabricated by any applicable materials, such as aluminum, stainless steel, plastic, polymer, alloy, ceramic, and/or a combination of one or more of aluminum, stainless steel, plastic, polymer, alloy, and ceramic. The turbine provides a vacuum area above the incoming liquid (water) and reduces the boiling point of the liquid. The turbine acts as a compressor lowering the pressure whereby reducing boiling point of the liquid. A top plate 401 is used to anchor and/or secure turbine 405 as well as blades or flutes 404.

Flow guide 406, which may be in a cone shape, is configured in such a way that it creates and guides a directional vapor whirlpool between heat source, not shown in FIG. 4, and turbine 405 in response to the vacuum generated by turbine 405. During an operation, upon creation of the vacuum, one or more directional vapor flows are generated in accordance with the directional vapor whirlpool. The directional vapor flows are subsequently guided, pushed, and/or forced into input ports 402-403 of blades or flute 404. When vapor flows are highly compressed and pass through narrow portions of flutes 404, the physical phase transition takes place as vapor flows are condensed into purified water. The heat or energy released as a result of phase transition is added to the heat source to generate more vapors. Note that turbine 405 and flow guide 406 are at least part of compressor.

Figure 5:
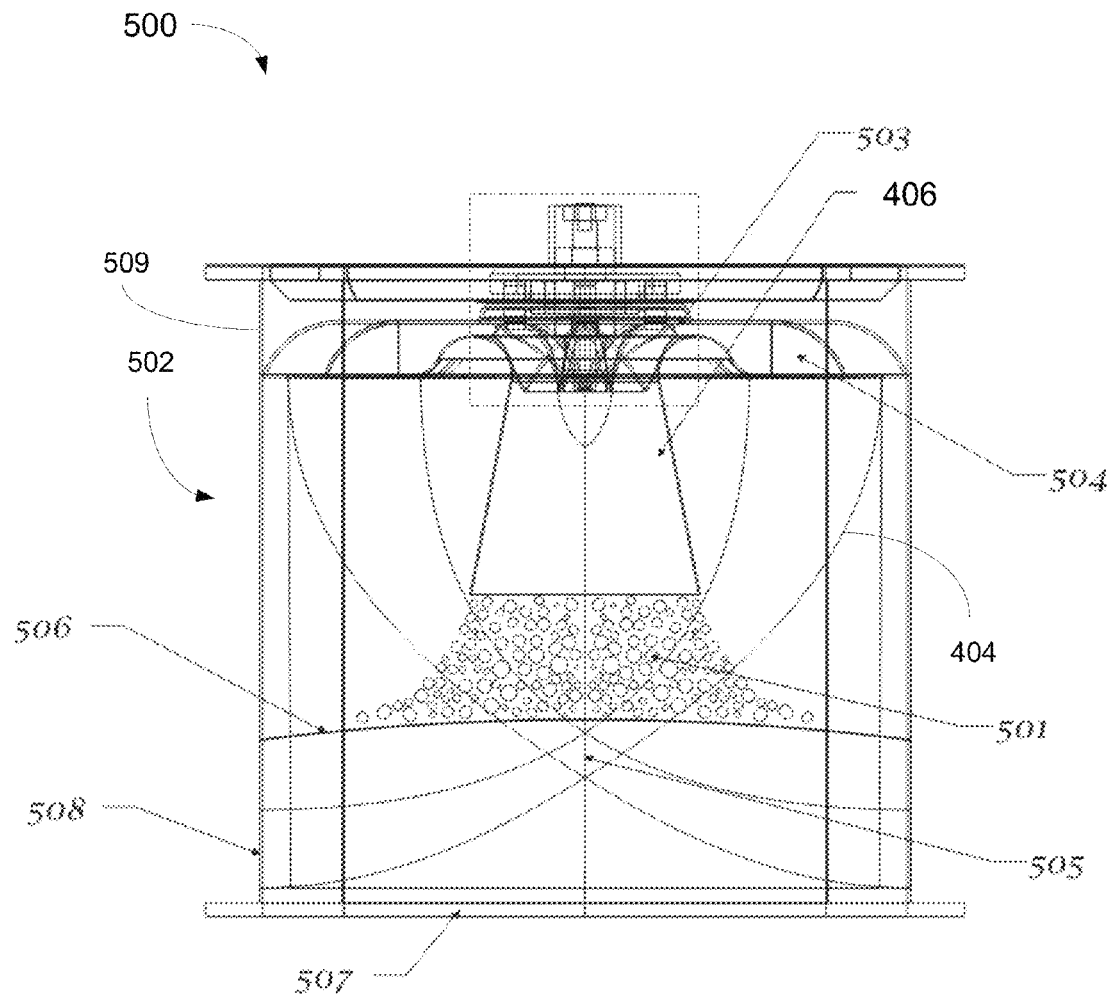
FIG. 5 is a diagram illustrating a cross-section view of liquid purification apparatus or system in accordance with one embodiment of the present invention.

FIG. 5 is a diagram 500 illustrating a cross-section view of liquid purification apparatus or HRP system in accordance with one embodiment of the present invention. Diagram 500 includes a main boiler 502, bottom boiler-collector 508, upper-manifold 509, center-manifold 506, and lower-manifold 507, wherein the manifolds are used to separate bottom boiler-collector 508 from main boiler 502. In one embodiment, main boiler 502 is used to process or produce purified water while bottom boiler-collector 508 is used to process or discard the waste water, substances with impurities, and/or discarded water. It should be noted that the underlying concept of the exemplary embodiment(s) of the present invention would not change if one or more components (or blocks) were added to or removed from diagram 500.

Upper-manifold 509 is coupled to turbine 503, blades 404, and flow guide 406. A function of upper-manifold 509 is to distribute vapor flows from main boiler 502 to blades 404 via various manifold channels 504 after vapor 501 is drawn up by turbine 503 from the bottom of main boiler 502 near the heat source to the top of main boiler 502. In an alternative embodiment, a compressor, which includes turbine 503 and flow guild 406, is coupled to upper-manifold 509 to create a vacuum area near the top of main boiler 502 for generating a directional vapor whirlpool.

The vapor flows are pressurized and condensed at the narrow regions of condenser blades 404 around epic center 505 which is the area that heat exchange occurs. In one aspect, epic center 505 is hottest or warmest area in main boiler 502. Epic center 505 is created when pressurized vapor flows through narrow portions of flutes 404 and the physical phase transition takes place around epic center 505. When vapor is condensed into purified water, heat or energy is released as a result of phase transition.

Figure 6A:
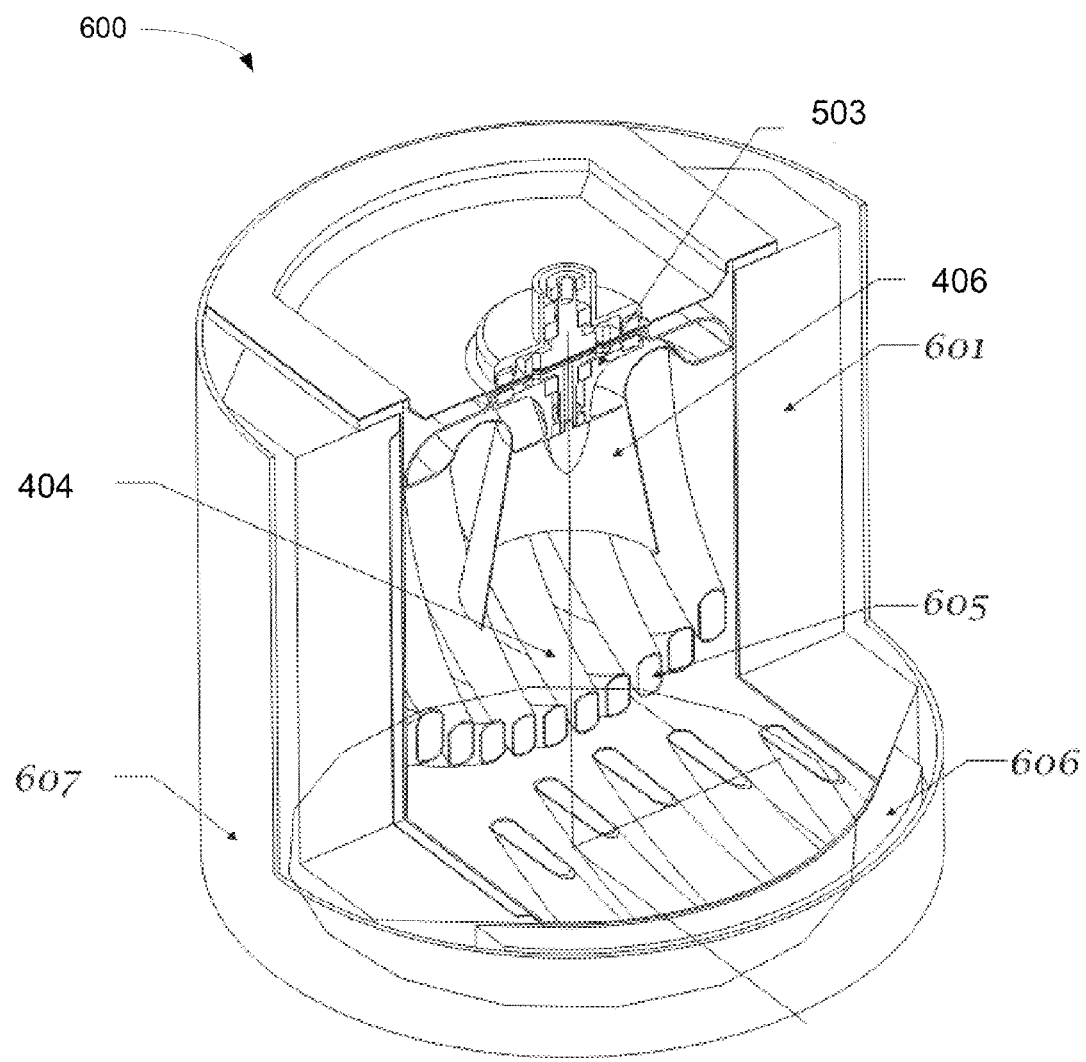
FIG. 6A is a diagram illustrating a cutaway perspective view of a liquid purification system using a heat regenerative mechanism in accordance with one embodiment of the present invention.

FIG. 6A is a diagram 600 illustrating a cutaway perspective view of HRP system using a heat regenerative mechanism in accordance with one embodiment of the present invention. Diagram 600 includes turbine 503, flow guide 406, blades 404, heat exchanger 601, bottom heat exchanger 606, and a housing 607, wherein housing 607 houses all components of HRP system. In one aspect, the cut-open areas 605 of blades 404 are the epic center where larger amount of heat is generated by the phase transition or heat exchange. Heat exchanger 601 is used to extract heat from purified water as it flows out of the HRP system. The extracted heat is used to preheat the coming water. Bottom heat exchanger 606 is used to extract heat from waste water or liquid containing high concentration of impurities. Again, the extracted heat from the waste water is used to preheat the incoming cold water. The Housing is the outer element of the heat exchangers 607 which is comprised of double-walled, vacuumed element. The housing element is used to provide mechanical and structure support for enclosed components, and also acts as a thermal energy rectifier and retainer.

Figure 6B:
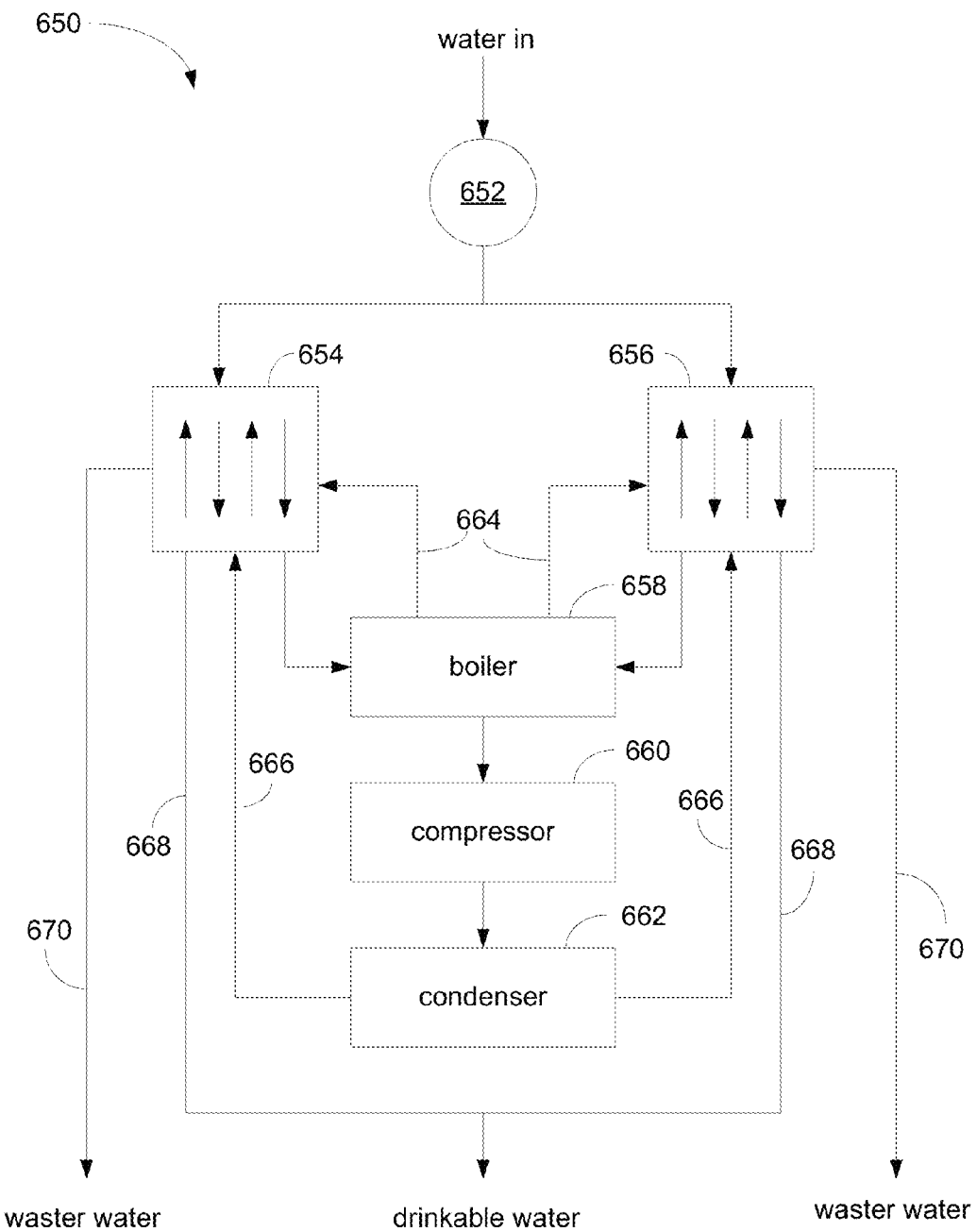
FIG. 6B is a logic block diagram illustrating an exemplary process of purifying liquid using heat regenerative mechanism in accordance with one embodiment of the present invention.

FIG. 6B is a logic block diagram 650 illustrating an exemplary process of purifying liquid using heat regenerative mechanism in accordance with one embodiment of the present invention. Diagram 650, which can be implemented in HRP system, includes a first heat exchanger 654, second heat exchanger 656, boiler 658, compressor 660, and condenser 662. In one aspect, first heat exchanger 654 is the main or top heat exchanger situated around the main boiler and second heat exchanger 656 is the bottom heat exchanger situated around the bottom boiler. It should be noted that the underlying concept of the exemplary embodiment(s) of the present invention would not change if one or more blocks were added to or removed from diagram 650.

In operation, when incoming water passes through a pump 652, the incoming water flows through both heat exchangers 654-656 to be preheated by the processed water. After flowing through heat exchangers 654-656, incoming water flows into boiler 658 to convert from water to steam or vapor via a heat source or a burner. Compressor 660 pushes or forces converted steam or vapor into condenser 662. The heavy (or waste) water or water containing high concentration of impurities flows back to heat exchangers 654-656 via channels 664 before it is being discarded via channel 670. Condenser 662 converts steam or vapor back into liquid or purified water and subsequently guides the purified water back to heat exchanger 654-656 via channels 666. Exchangers 654-656 extracts heat from purified water before allowing the purified water to exit the HRP system via channel 668.

It should be noted that, in addition to purifying water or liquid, exemplary process of purifying liquid using heat regenerative mechanism illustrated in FIG. 6B is applicable to any liquid substance purification process that uses vacuum, pressure and temperature as a controls of the environment for vapor condensation phase distillation.

Figure 7:
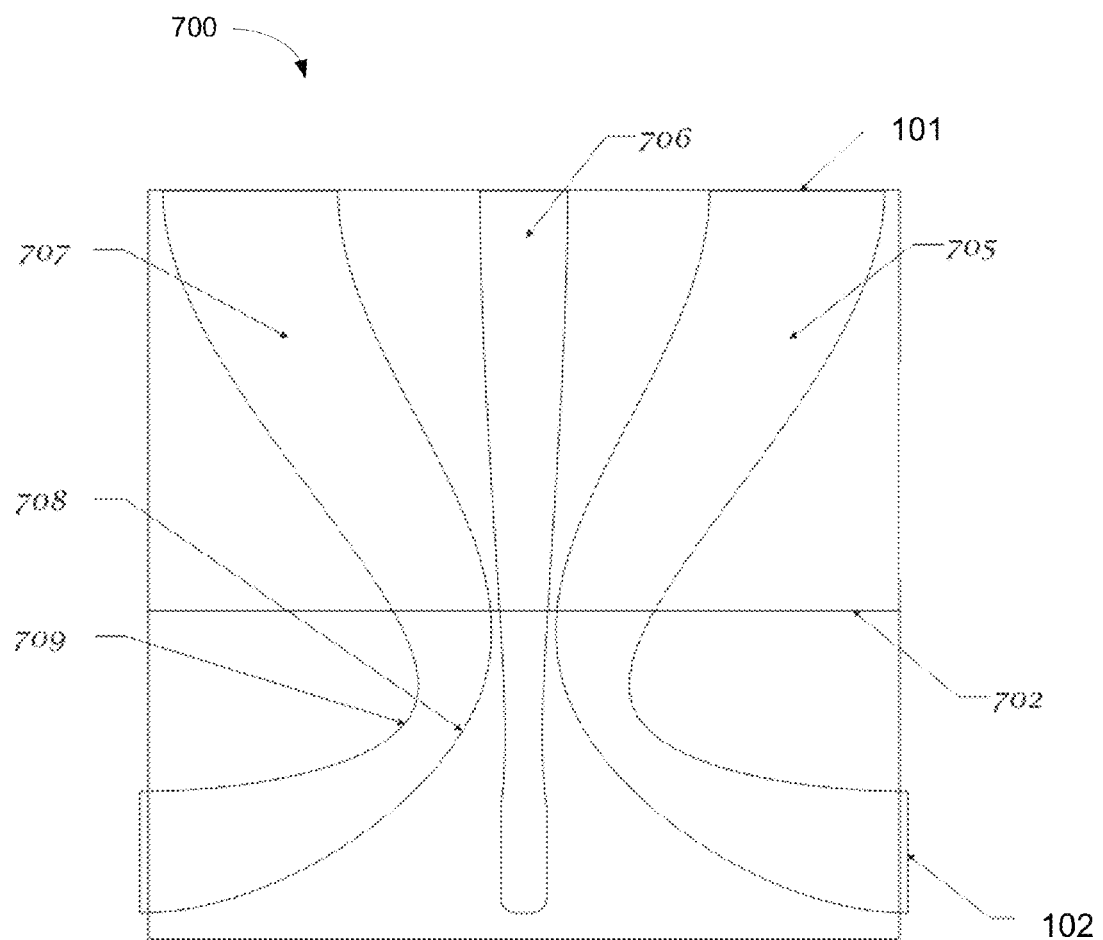
FIGS. 7-9 illustrate alternative designs or configurations to manufacture blades or flutes to achieve optimal heat exchange and vapor condensation in accordance with embodiments of the present invention.
Figure 8:
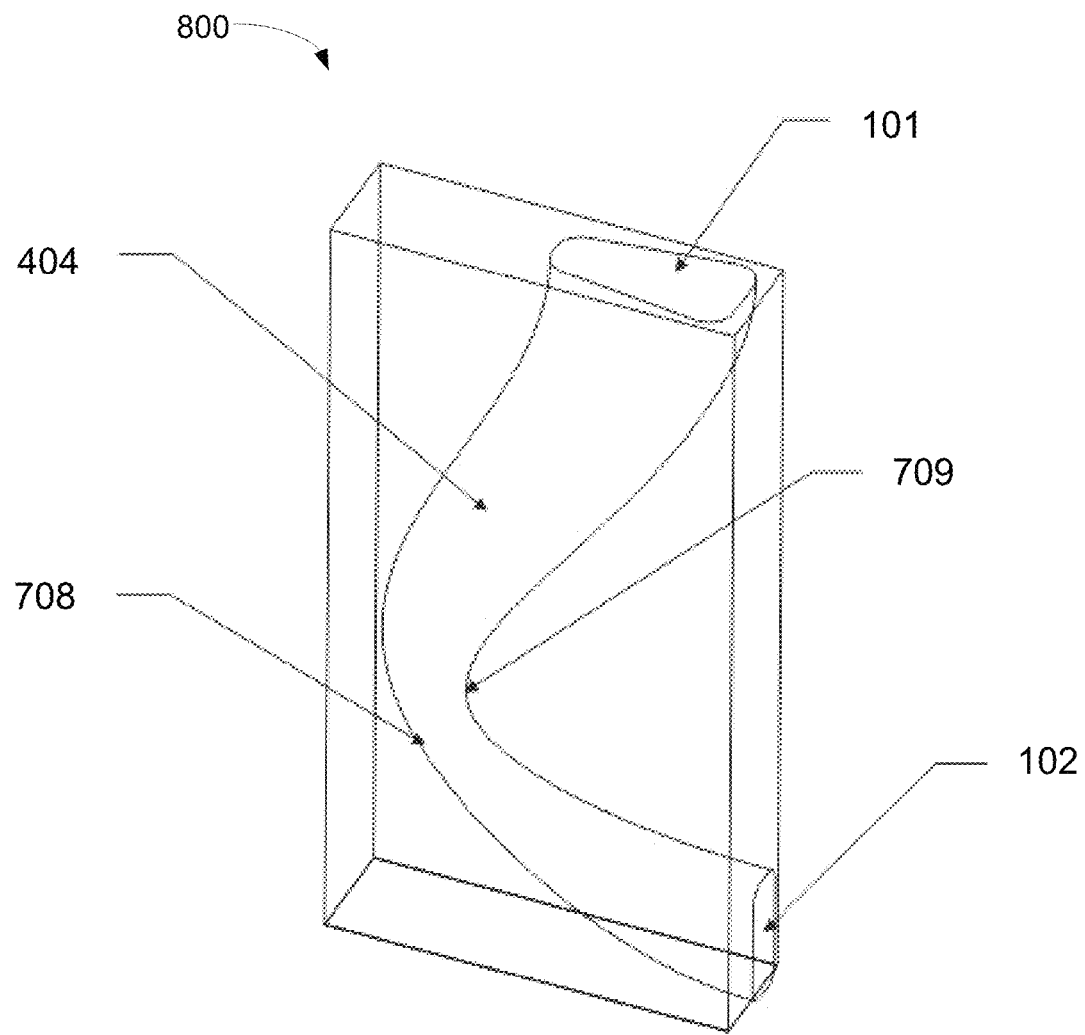

FIG. 7 is a diagram 700 illustrating an alternative design or configuration of blades or flutes to achieve optimal heat exchange and vapor condensation in accordance with embodiments of the present invention. Diagram 700 shows three (3) blades 705-707 wherein the distance between the points indicated by numeral 708-709 is application dependent. The line 720 indicates an area for phase transition between steam and water. FIG. 8 illustrates a 3D perspective view showing a blade which is similar to the blade shown in FIG. 7.

Figure 9:
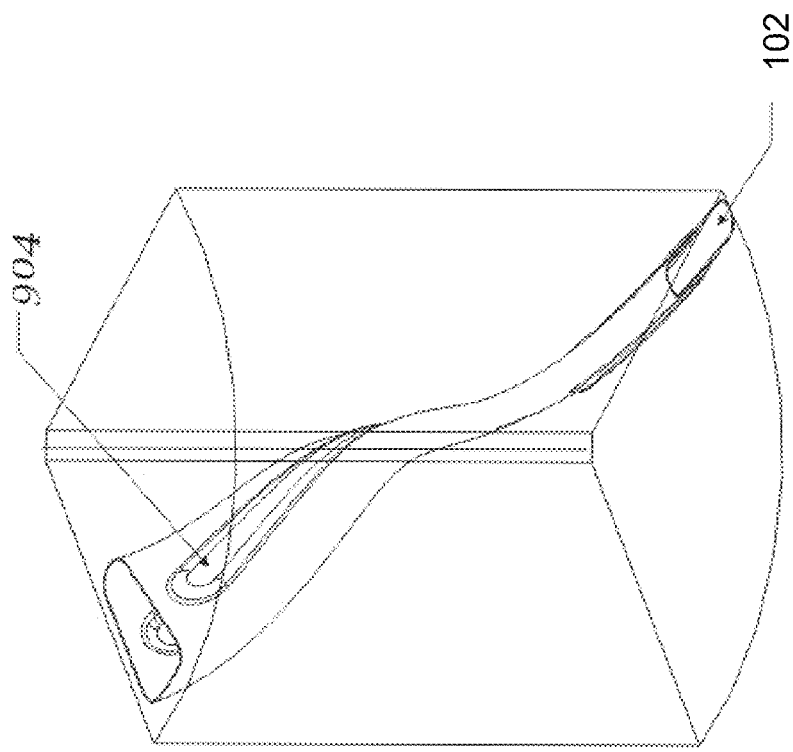
Figure 9:
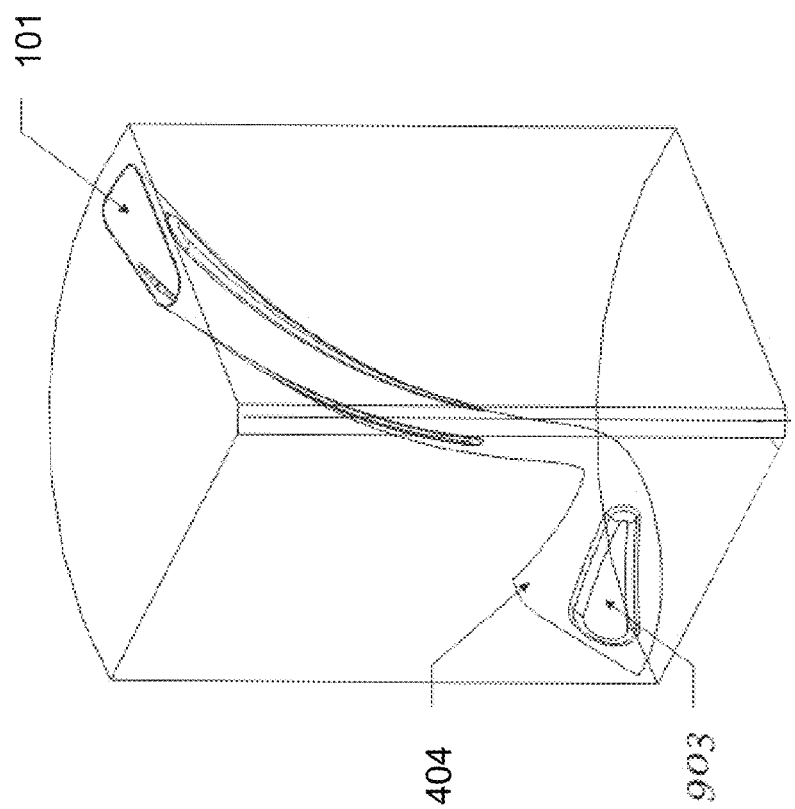

FIG. 9 illustrates alternative designs or configurations to blades or flutes to achieve optimal heat exchange and vapor condensation in accordance with embodiments of the present invention. In one embodiment, blades 404 shown in FIG. 9 includes one or more features 903-904 to reinforce the structure of blades especially if the blade is made of thin and pliable material such as stainless steel or titanium or alloy are used. The feature is to aid and to retain the shape of the profile of the blade. Structural reinforcements by features 903-904 may be necessary to maintain the configuration of blades which are under continuous fluctuation of pressure and temperature. Fine element analysis produces improved performance of mechanical stability when temperature and pressure changes occur. It should be noted that the shape of blades illustrated in FIG. 9 is different from the shape of blades illustrated in FIG. 8. Depending on the applications, one configuration can have better results (more efficient) than another configuration.

Figure 10:
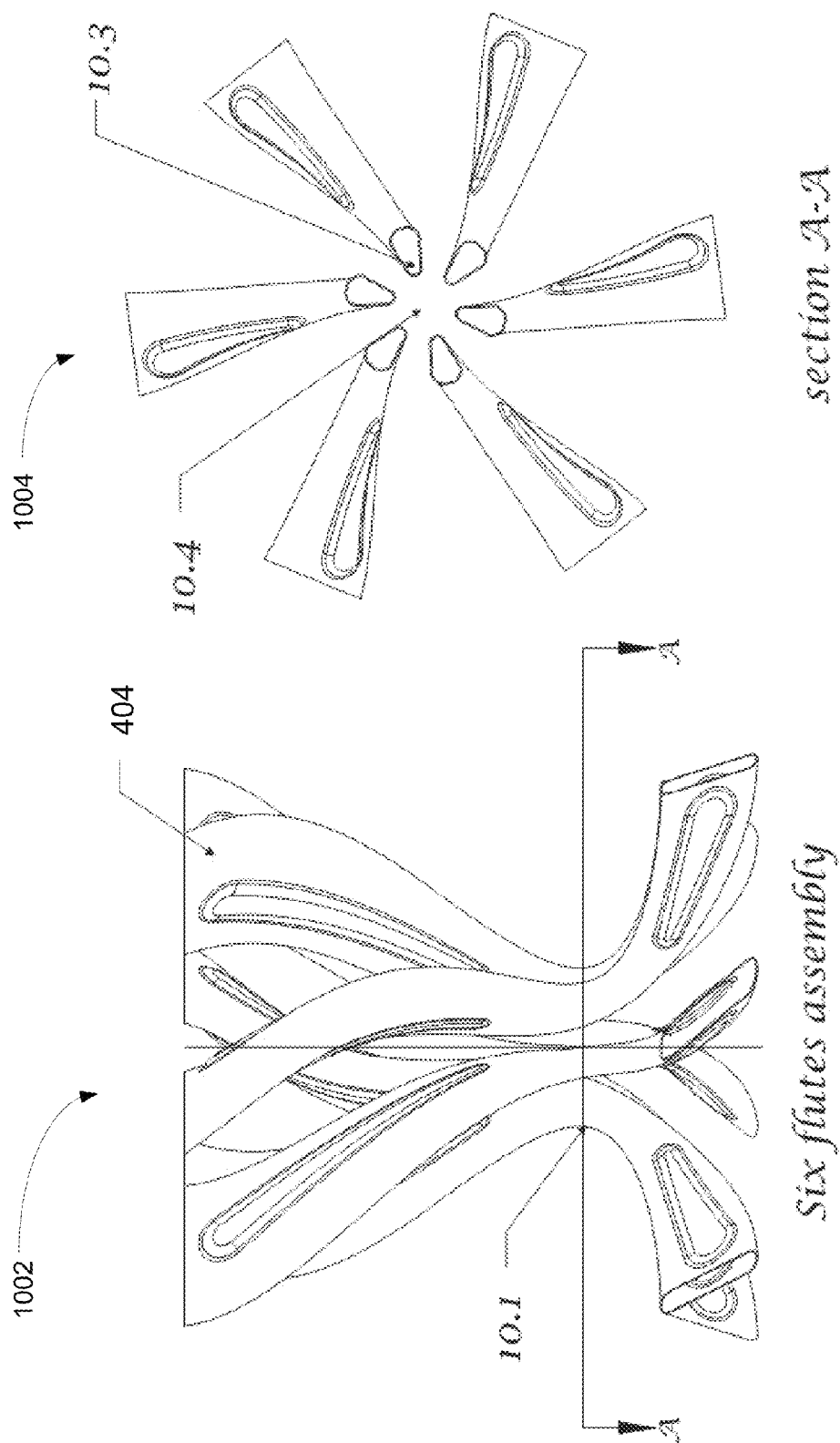
FIGS. 10-13 illustrate alternative configurations of vapor condensers including multiple flutes or blades assemblies in accordance with one embodiment of the present invention.

FIG. 10 illustrates an exemplary configuration of vapor condensers including six (6) flutes or blades in accordance with one embodiment of the present invention. FIG. 10 shows diagram 1002 containing six flutes assembly and diagram 1004 illustrating a cross-section view of diagram 1002 in accordance with section line A-A. It should be noted that areas pointed by numeral 10.1-10.4 are location(s) where phase transition occurs.

Figure 11:
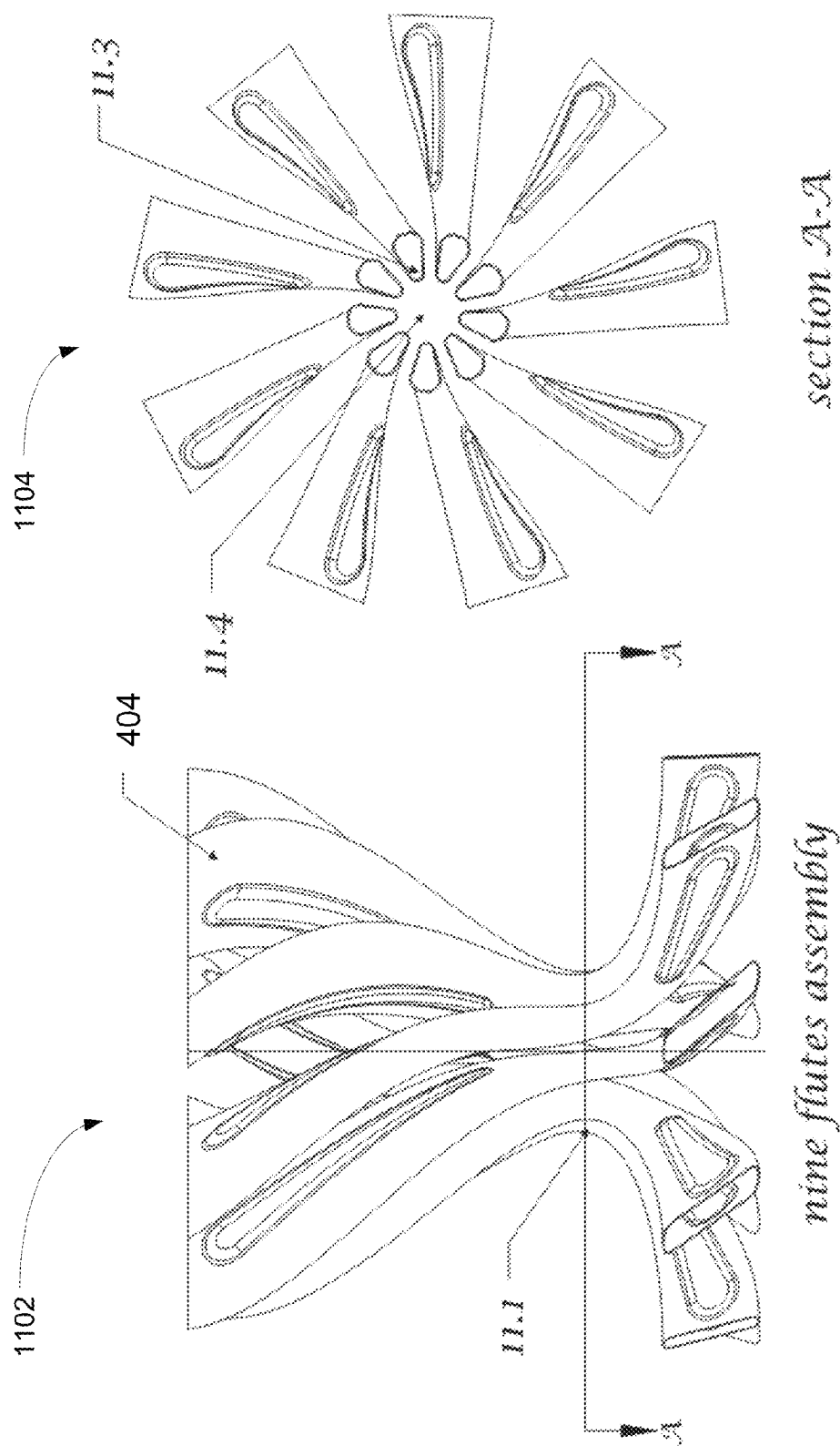

FIG. 11 illustrates an exemplary configuration of vapor condensers including nine (9) flutes assemblies in accordance with one embodiment of the present invention. FIG. 11 shows diagram 1102 containing nine flutes assembly and diagram 1104 illustrating a cross-section view of diagram 1102 in accordance with section line A-A. It should be noted that areas pointed by numeral 11.1-11.4 are locations where phase transition occurs.

Figure 12:
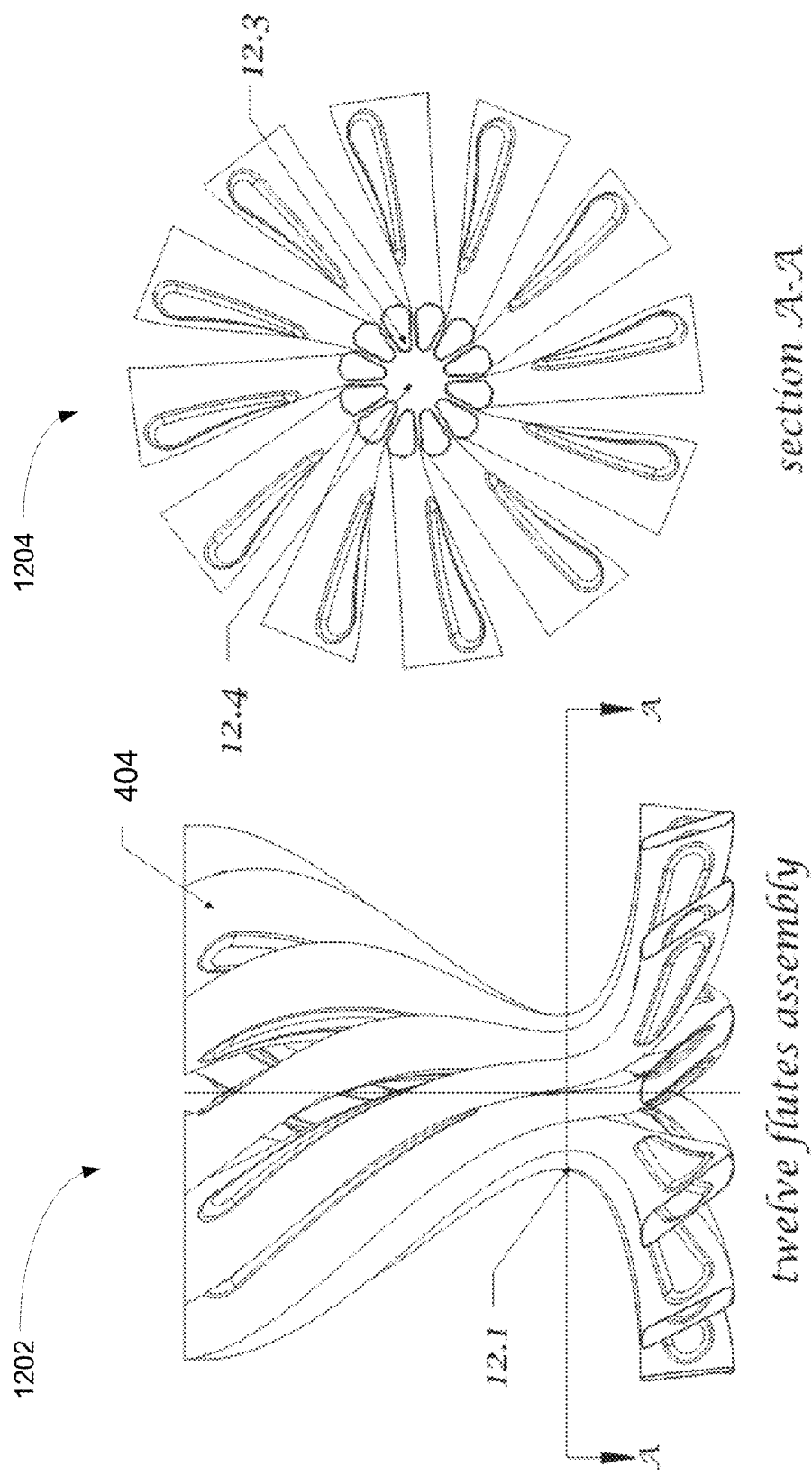
Figure 13:
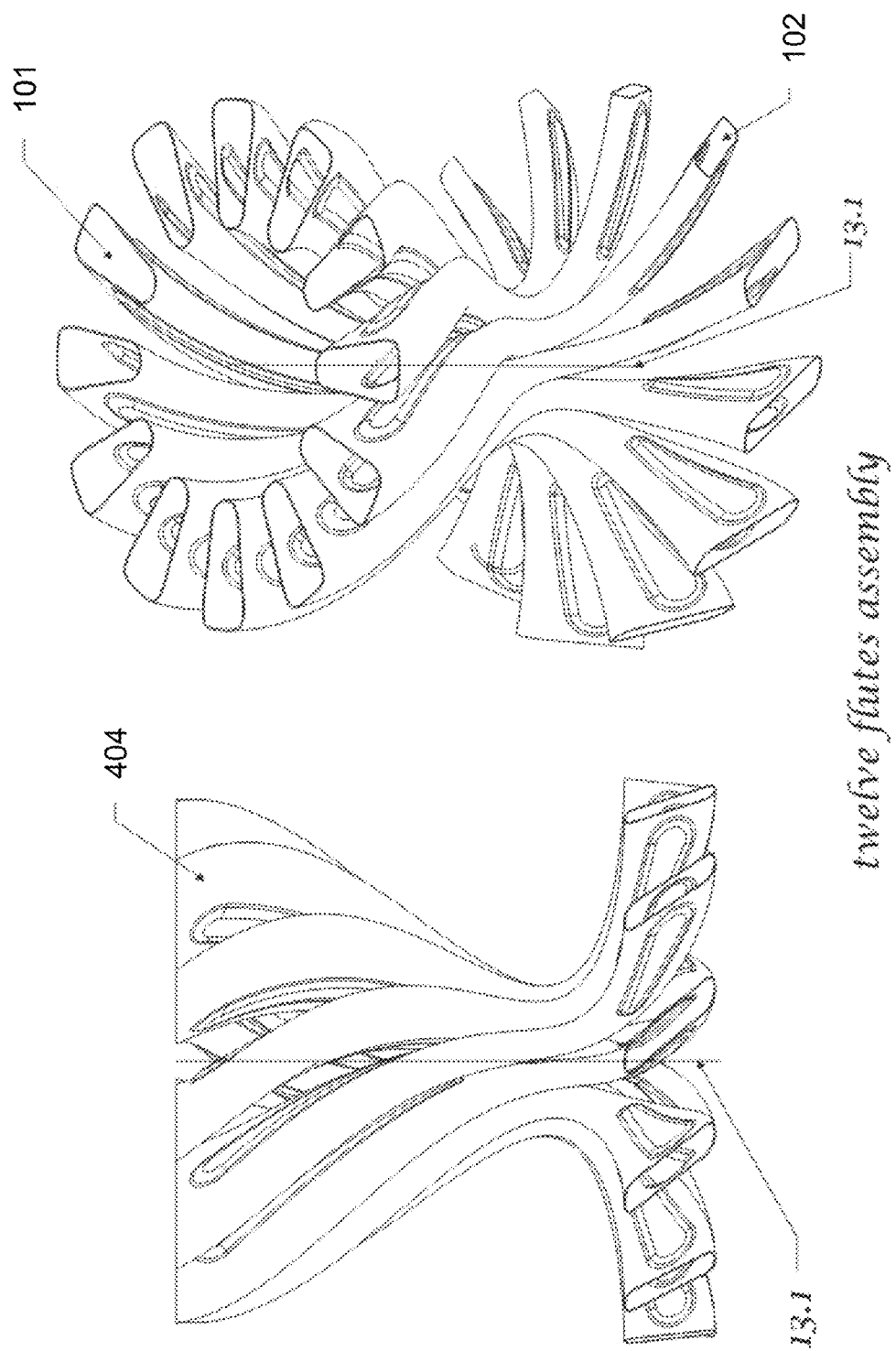

FIGS. 12-13 illustrate an exemplary configuration of vapor condensers including twelve (12) flutes assembly in accordance with one embodiment of the present invention. FIG. 12 shows diagram 1202 containing nine flutes assembly and diagram 1204 illustrating a cross-section view of diagram 1202 in accordance with section line A-A. It should be noted that areas pointed by numeral 12.1-12.4 are locations where phase transition occurs. FIG. 13 illustrates a 3D view of vapor condensers having twelve (12) flutes assembly. Note that numeral 13.1 points the middle section of the boiler.

Figure 14:
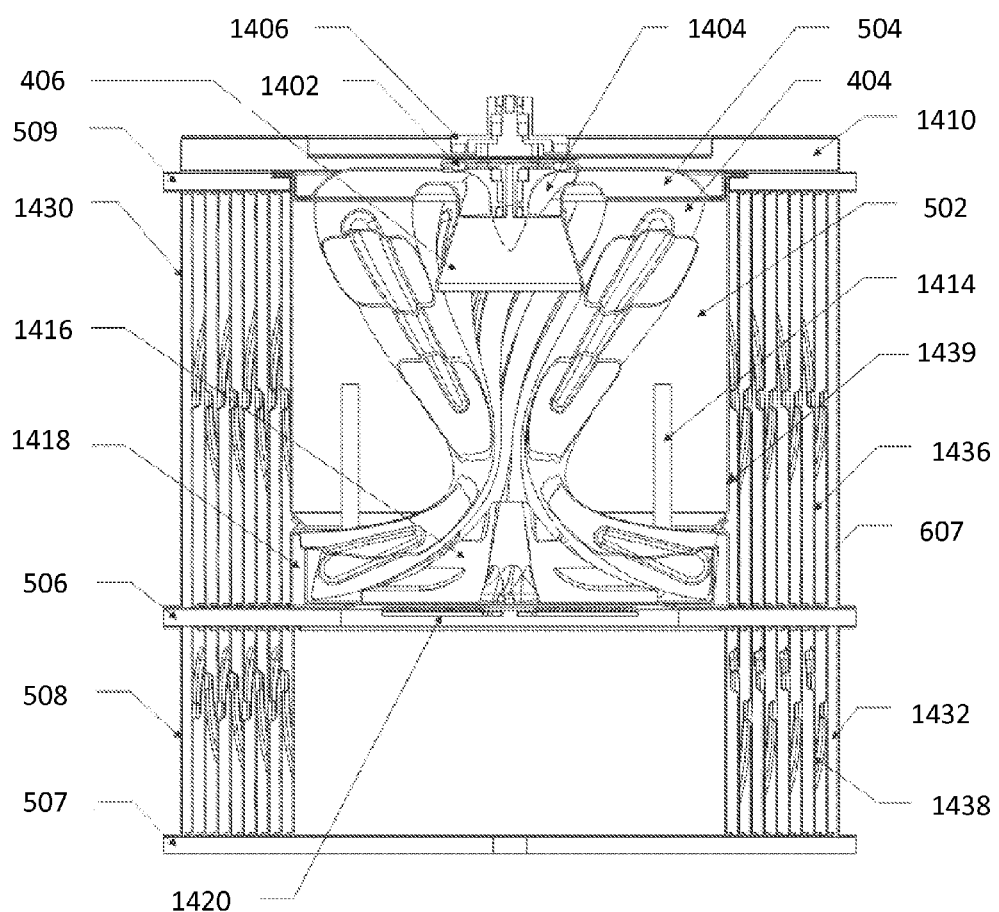
FIG. 14 is a diagram illustrating a cross section view of a main assembly capable of regenerating or reclaiming heat from processed liquid to achieve optimal energy efficiency in accordance with one embodiment of the present invention.

FIG. 14 is a diagram 1400 illustrating a cross-section view of a main assembly or HRP system capable of regenerating or reclaiming heat from processed liquid to achieve optimal energy efficiency in accordance with one embodiment of the present invention. Diagram 1400 includes a turbine 1402, main boiler 502, cover 1410, heat exchanger 1430, bottom heat exchanger 1432, directional heater 1416, and heat source 1420. Turbine 1402, in one aspect, further includes a motor 1406 and a turbine blade 1404. It should be noted that the underlying concept of the exemplary embodiment(s) of the present invention would not change if one or more components (or blocks) were added to or removed from diagram 1400.

In one embodiment, heat exchanger 1430 and bottom heat exchanger 1432 are interconnected wherein heat exchanger 1430 uses multiple pipes and/or tubes to extract heat from purified water when it passes through heat exchanger 1430. Bottom heat exchanger 1432 also employs various tubes to extract heat from waste water when it passes through bottom heat exchanger 1432. The heat exchanger 1430-1432 includes at least two independent sets of tubes or pipes 1436-1438 allowing incoming water which is cold to occupy one set of tubes while allowing processed water which is hot to occupy another set of tubes. Heat exchanger 1430-1432 further includes entrances 1418 capable of accepting processed water from the condenser to the heat exchanger.

Heat source 1420, which can be powered by electricity, solar, wind power, gasoline, or mechanical manual power generator, is coupled with heat guide 1416 to convert water molecules from liquid formation to vapor formation. A function of posts 1414 is to anchor various components. It should be noted that HRP system 1400 may include additional electronic components at bottom boiler 508. In one embodiment, liquid receptacle 1439 includes a water-input receptacle capable of receiving a flow or stream of water from an external device.

Figure 15:
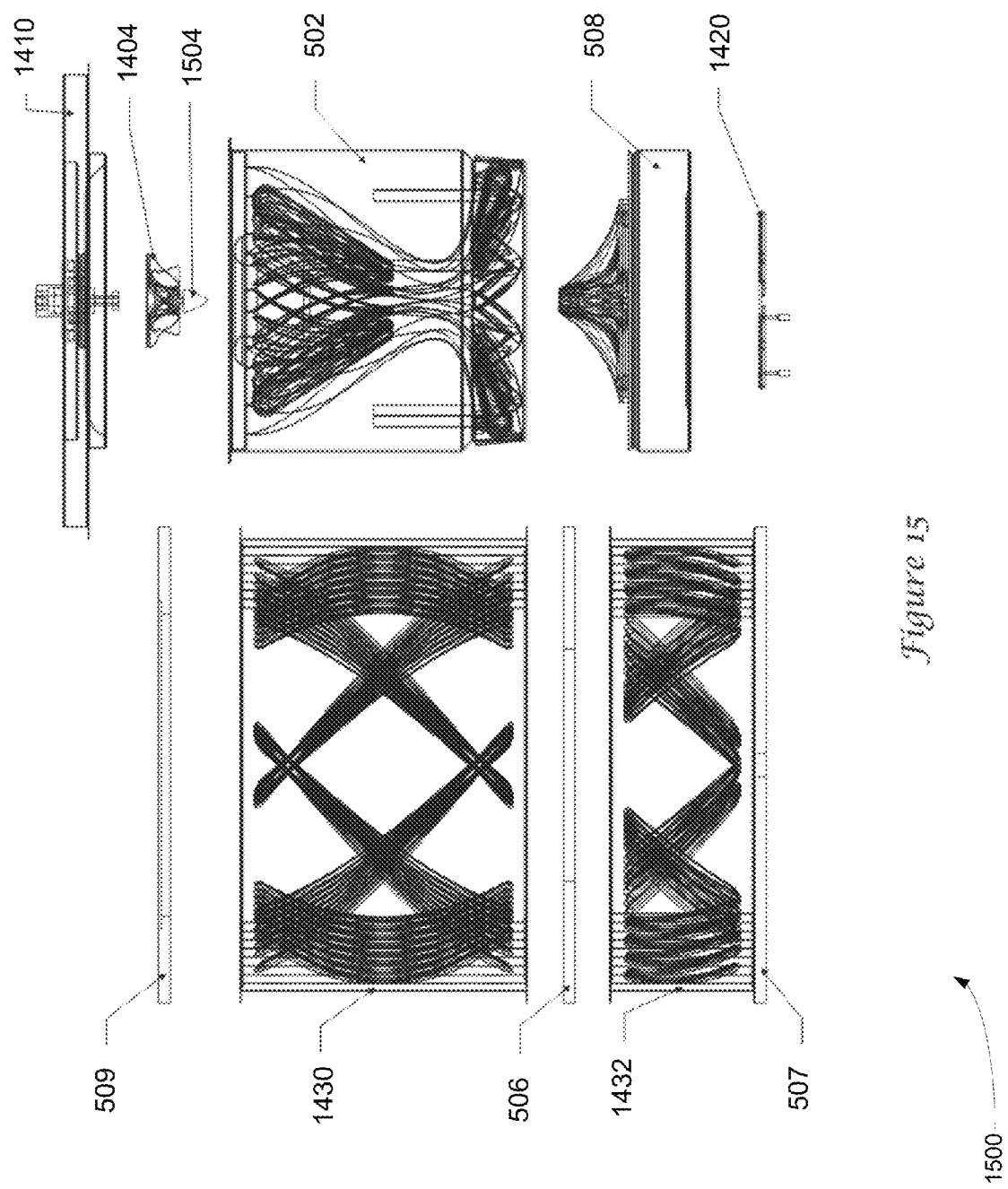
FIG. 15 illustrates an exemplary heat exchanger capable of reclaiming heat from processed liquid in accordance with one embodiment of the present invention.

FIG. 15 is a diagram 1500 illustrating an exemplary heat exchanger flow profile showing heat reclaiming process from processed liquid in accordance with one embodiment of the present invention. Diagram 1500 includes a turbine, a boiler 502, a top heat exchanger 1430, and a bottom heat exchanger 1432. The turbine includes a turbine blade 1404 and a nut 1504 wherein the turbine provides a vacuum above the incoming water to reduce the boiling point of the incoming water. The incoming water is preheated by the heat extracted from the processed water before it exits the HRP system. In one embodiment, the processed water or liquid is channeled by one or more pumps scattered across the heat exchanger(s) wherein the pumps, in one embodiment, are powered by pressurized incoming water. Note that the liquid is on the outside of the heat exchange tubes and the vapor and condensed liquid is on the inside of the heat exchanger tubes. It should be noted that the underlying concept of the exemplary embodiment(s) of the present invention would not change if one or more components (or blocks) were added to or removed from diagram 1500.

Figure 16:
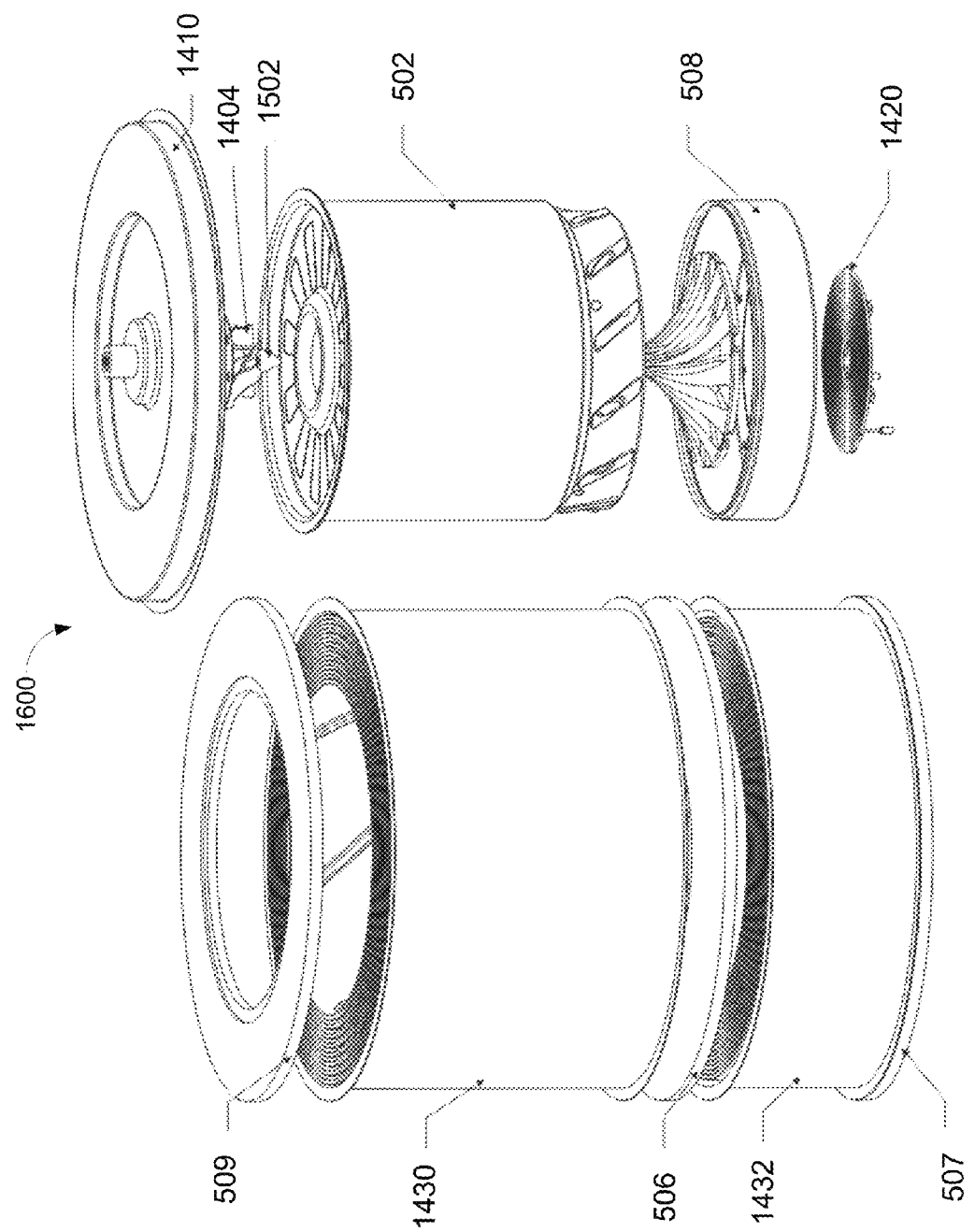
FIG. 16 is an exploded view of a main assembly configured to process liquid using heat regenerative mechanism in accordance with one embodiment of the present invention.

FIG. 16 is a diagram 1600 illustrating an exploded view of a main assembly or HRP system configured to process liquid using heat regenerative mechanism in accordance with one embodiment of the present invention. Diagram 1600 shows boiler 502, bottom boiler 508, heat exchanger 1430, and bottom exchanger 1432, wherein boiler 502 and bottom boiler 508 are structured such that they can fit inside of heat exchanger 1430-1432.

In one aspect, HRP system includes a boiler, turbine, condenser, heat exchanger, and feed pump(s). The system operates under the principles of the Regenerative cycle. The condenser exchanges heat with water in the boiler, and the heat exchanger acts to preheat incoming water, while cooling outbound processed and waste water. In an operation, water enters the boiler where it is heated past the critical point, and steam is generated. The turbine draws a vacuum in the boiler and forces the steam through a manifold and through the condenser. Since the boiling points of impurities normally found in water are higher than the boiling point of water, the water vapor is assumed to be pure as it flows through the turbine. The mechanism of injecting water into the boiler, in one example, promotes rotational flow within the main body, shaping the flow as it approaches the turbine.

Additionally, the configuration of the blades in the condenser is such that heat transfer back into the bulk media is at a maximum by optimizing the level of wetted surface area. The shape of the blades and their configuration also serves to smooth flow of steam through the boiler and into the turbine. The flow of purified water through the condenser splits into 1 of 2 intake manifolds, each one serving a respective bank of condenser blades. The manifolds feed into identical counter flow heat exchangers, which use incoming feed water as the cold working fluid, and exiting purified and exiting waste water as the hot working fluid. The use of symmetry is meant to promote optimal efficiency by precisely managing the thermal gradient within the control volume. The shape of the blades is aimed to correspond with the proposed water fill line. This entire system is wrapped by a skin of stainless steel, and the heat exchangers will be placed on either side of the condenser banks.

The exemplary aspect of the present invention includes various processing steps, which will be described below. The steps of the aspect may be embodied in machine or computer executable instructions. The instructions can be used to cause a general purpose or special purpose system, which is programmed with the instructions, to perform the steps of the exemplary aspect of the present invention. Alternatively, the steps of the exemplary aspect of the present invention may be performed by specific hardware components that contain hard-wired logic for performing the steps, or by any combination of programmed computer components and custom hardware components.

Figure 17:
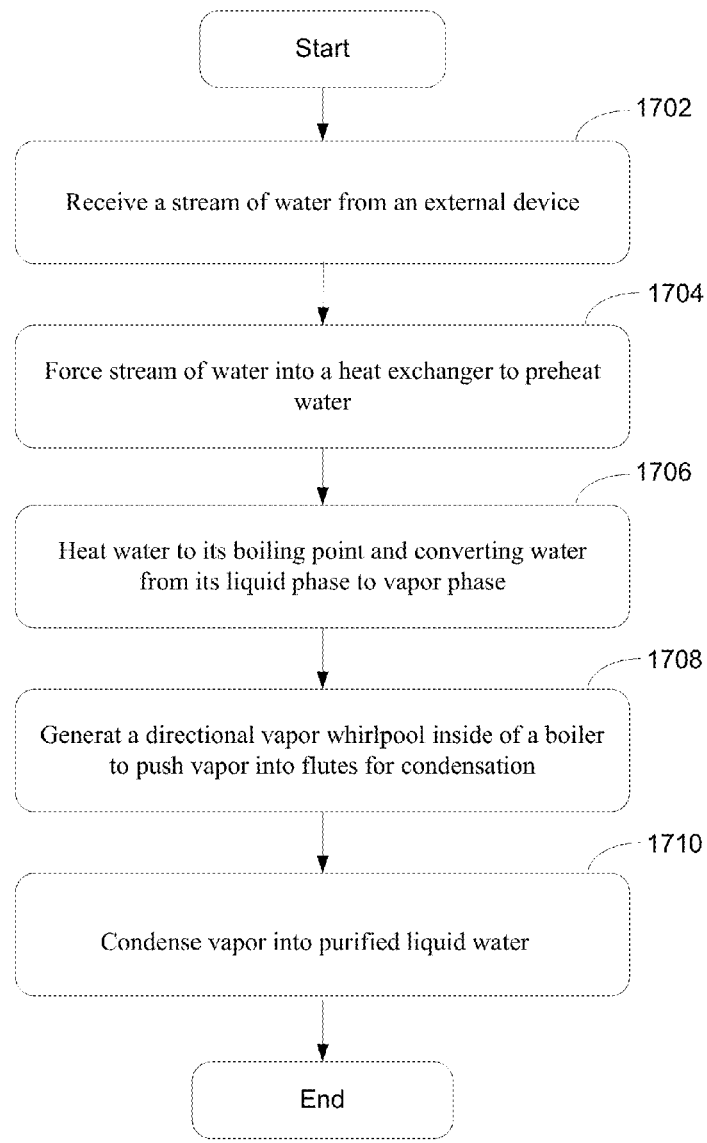
FIG. 17 is a flowchart illustrating a process of liquid purification using heat regenerative mechanism in accordance with one embodiment of the present invention.

FIG. 17 is a flowchart illustrating a process of liquid purification using heat regenerative mechanism in accordance with one embodiment of the present invention. At block 1702, a process capable of implementing regenerative heat exchange receives a stream of cold water from an external device, such as a municipal water supply company, river, well, pond, reservoir, or the like. Upon activating heat extracting pumps in response to water pressure provided by the stream of cold water, the process pushes or pumps purified water through the heat exchanger for transferring or extracting heat from purified water to the stream of cold water. The process also pushes or forces the discarded liquid such as waste water through the heat exchanger to extracting heat from the discarded liquid to preheat the stream of water.

At block 1704, when the stream of cold water enters the heat exchanger for preheating as the stream passes through the heat exchanger, water in the stream is heated to its boiling point when it reaches to the epic center. At block 1706, the stream of water is separated between purified water and waste water by converting a portion of water into vapor. At block 1708, a directional vapor whirlpool is generated inside of a boiler to push the vapor into a set of flutes for condensation.

At block 1710, the flutes or blades in the condenser condense vapor into purified water. The process forces the vapor through a set of angular shaped flutes capable of facilitating regenerating heat exchange between the angular shaped flutes. The purified water is subsequently pumped into the heat exchanger for heat extracting. The heat extracting or heat exchange occurs when hot pipes or tubes in the heat exchanger carrying hot purified water pass adjacent to cold pipes or tubes in the heat exchanger carrying the stream of cold water wherein the heat extracted from purified water preheats the incoming cold water. The hot waste water, on the other hand, is allowed to flow into the heat exchanger for heat extracting or heat reclaiming process. The heat reclaiming process occurs when hot pipes in the heat exchanger carrying the waste water pass adjacent to cold pipes in the heat exchanger carrying the stream of cold water. Upon activating heat extracting pumps in response to water pressure provided by the stream of water, the purified water is pushed through the heat exchanger for transferring heat from the purified water to the stream of water. The discarded liquid is also pumped through the heat exchanger for preheating the stream of water.

While particular embodiments of the present invention have been shown and described, it will be obvious to those of skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A liquid purification apparatus, comprising:
a liquid receptacle configured to receive a stream of liquid, wherein the liquid receptacle includes a water-input receptacle capable of receiving a flow of water from an external device; a boiler coupled to the liquid receptacle;
a heat exchanger structured in cylindrical shape with a cavity which is configured to house the boiler, the heat exchange configured to push the liquid through the heat exchanger to increase temperature of the liquid via at least a portion of processed liquid;
a directional heater coupled to a heat source and capable of facilitating phase transition of the liquid from liquid to vapor;
a compressor coupled to the directional heater and operable to guide and compress the vapor; and
a condenser coupled to the compressor and configured to condense the vapor into liquid, wherein the condenser includes a plurality of blades wherein each of the plurality of blades is shaped in such a way that it optimizes condensation from the vapor to purified water.

2. The apparatus of claim 1, wherein the stream of water is pressurized having a range from 2 pounds per square inch ("PSI") to 200 PSI, wherein the water has a molecular structure of one oxygen and two hydrogen atoms connected by covalent bonds ("H2O").

3. The apparatus of claim 1, wherein the heat exchanger includes,
a top heat exchanger configured to preheat incoming water with purified water; and
a bottom heat exchanger configured to preheat incoming water with discarded water.

4. The apparatus of claim 3, wherein the top heat exchanger is configured to cool down purified water with incoming water before the purified water leaves the apparatus.

5. The apparatus of claim 4, wherein the bottom heat exchanger is configured to cool down discarded water with incoming water before the discarded water leaves the apparatus as waste water.

6. The apparatus of claim 1, further comprising a heating mechanism containing the directional heater to heat water to a boiling point to separate pure water from impurities substance.

7. The apparatus of claim 1, wherein the compressor includes a turbine operable to create a directional vapor whirlpool inside of the boiler to force the vapor into the condenser.

8. The apparatus of claim 1, further includes a housing outer element which is configured to house the heat exchanger wherein middle of the heat exchanger is configured to house the compressor which sits on top of the condenser and the directional heater.

9. An apparatus having a boiler and a heat exchanger capable of producing purified water utilizing regenerative heat exchange, comprising:
means for receiving a stream of water from an external device;
means for forcing the stream of water into a heat exchanger having a cylindrical shape to allow the stream of water circling around adjacent to outer surface of the boiler following guidance of the heat exchanger for preheating the water as it passes through the heat exchanger;
means for heating the water to its boiling point and converting the water from its liquid phase to vapor phase;
means for generating a directional vapor whirlpool inside of a boiler to push the vapor into a plurality of flutes for condensation; and
means for condensing the vapor into purified water via the plurality of flutes.

10. The apparatus of claim 9, further comprising means for pumping the purified water into the heat exchanger for heat extracting when a plurality of hot pipes in the heat exchanger carrying the purified water pass adjacent to a plurality of cold pipes in the heat exchanger carrying the stream of water.

11. The apparatus of claim 9, wherein means for receiving a stream of water includes means for activating a plurality of pumps in response to water pressure provided by pressurized water.

12. A liquid purifier, comprising:
a cylinder shaped boiler configured to receive a stream of liquid;
a hollow cylinder shaped heat exchanger ("HCSHE") configured to house the cylinder shaped boiler in middle of HCSHE, wherein the HCSHE transfers at least a portion of heat from processed liquid to the stream of liquid as the stream of liquid travels from the HCSHE to the cylinder shaped boiler;
a heat source coupled to the cylinder shaped boiler and capable of facilitating phase transition of the liquid from liquid to vapor; and
a condenser coupled to the cylinder shaped boiler and configured to condense the vapor into the processed liquid;
wherein the HCSHE includes,
a top heat exchanger configured to preheat incoming water with purified water; and
a bottom heat exchanger configured to preheat incoming water with discarded water.

13. The purifier of claim 12 further comprising a compressor coupled to the cylinder shaped boiler and operable to guide and compress the vapor.

14. The purifier of claim 12, wherein the stream of liquid is pressurized water having a range from 2 pounds per square inch ("PSI") to 200 PSI, wherein the water has a molecular structure of one oxygen and two hydrogen atoms connected by covalent bonds ("H2O").

15. The purifier of claim 12, wherein the top heat exchanger is configured to cool down purified water with incoming water before the purified water leaves the apparatus.

16. The purifier of claim 15, wherein the bottom heat exchanger is configured to cool down discarded water with incoming water before the discarded water leaves the apparatus as waste water.

17. The purifier of claim 12, wherein the heat source having a directional heater is configured to heat the stream of liquid to a boiling point to separate pure liquid from impurities substance.

* * * * *